United States Patent [19]

Hamilton et al.

[11] Patent Number: 5,707,039
[45] Date of Patent: Jan. 13, 1998

[54] HYDRAULIC SOLENOID CONTROL VALVE

[75] Inventors: Melissa Ann Hamilton, Anderson; Kris Renee Stark, Noblesville; Hayse William Warrum, Jr., Indianapolis, all of Ind.

[73] Assignee: General Motors Corporation, Detroit, Mich.

[21] Appl. No.: 630,107

[22] Filed: Apr. 8, 1996

[51] Int. Cl.⁶ .................................................. F16K 31/06
[52] U.S. Cl. ............................... 251/129.17; 251/129.15
[58] Field of Search .......................... 251/129.15, 129.17, 251/129.01

[56] References Cited

U.S. PATENT DOCUMENTS

| | | |
|---|---|---|
| 2,181,423 | 11/1939 | Gille .................. 251/129.15 X |
| 5,129,623 | 7/1992 | Lockwood . |
| 5,282,604 | 2/1994 | Wade ...................... 251/129.17 |

Primary Examiner—Kevin Lee
Attorney, Agent, or Firm—Vincent A. Cichosz

[57] ABSTRACT

A hydraulic solenoid control valve has the capability of operating at high pulse width modulation frequencies due to precision alignment of the armature and freedom from contamination. An alignment tube coupled at one end to one pole piece aligns coaxially with the armature while a non-magnetic bearing coupled to the other end of the alignment tube also aligns coaxially with the armature. Fluid infusion into the armature cavity is prevented by way of the alignment tube which surrounds the armature.

7 Claims, 1 Drawing Sheet

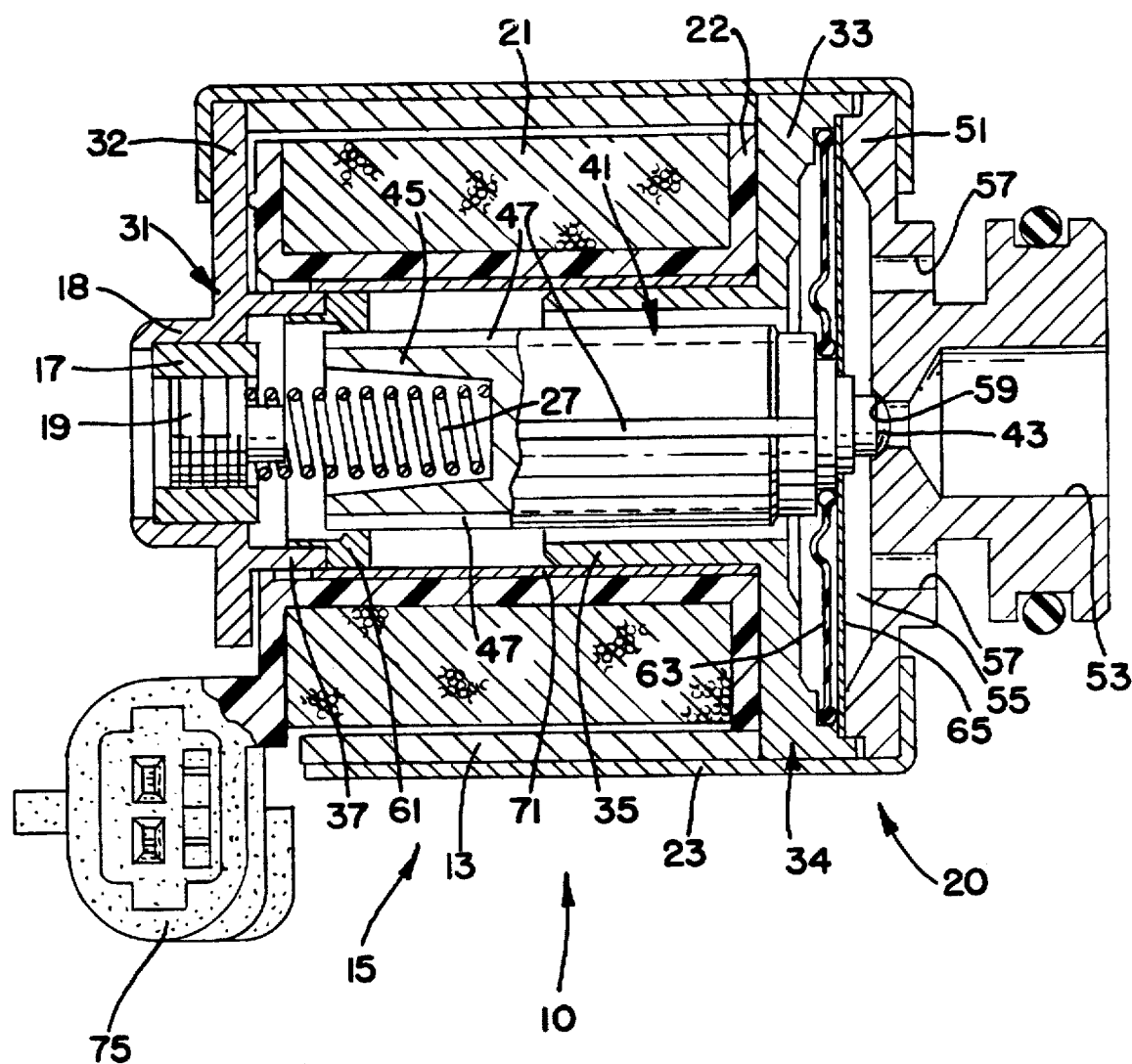

HYDRAULIC SOLENOID CONTROL VALVE

BACKGROUND

The present invention is related to solenoid operated control valves, and particularly such valves having application with lubricating hydraulic fluids in hydro-mechanical apparatus such as motor vehicle automatic transmissions.

Electromechanical solenoid operated control valves are widely used in the area of electronically controlled automatic transmissions. Two general types of such control valves include pulse width modulated (PWM) control valves and linear control valves. Both types are responsive to a control quantity, typically time varying voltage, to control line pressure, clutch chamber pressure or pilot pressure in a spool valve. It is generally understood that PWM valves have an armature which strokes between first and second positions substantially in frequency correspondence with a time varying voltage signal while a linear control valve has an armature which assumes an equilibrium position in accordance with the electromagnetic force generated by the average current through the solenoid coil and internal bias spring and hydraulic forces.

PWM valves tend to be characterized by relatively large swings in control pressure in relatively low compliant hydraulic situations such as when supplying a full control chamber of a clutch pack. This characteristic may be attenuated somewhat by increasing the PWM frequency; however, upper PWM frequency is limited by pull in and drop out times of the solenoid and armature.

Linear control valves tend to be characterized by less variation in control pressure since the armature is not traveling from stop to stop during each PWM cycle while using higher PWM operating frequencies. Linear control valves are generally operated with an amount of dither in the current through the solenoid coil to effectuate a mechanical analog upon the armature which trades control pressure variation for hysteretic performance improvements. In PWM applications, the dither is essentially a function of the impedance characteristics of the solenoid coil and the PWM frequency of the drive signal. All else being equal, PWM frequency increases tend to increase hysteresis and require reduction in armature friction forces.

It is well known that hydraulic contaminants, from such varied sources as manufacturing and assembly operations as well as wear, fluid fill, etc. may be present and indeed may increase over the operative life of an automotive transmission. Contaminants particularly troublesome to electronically controlled transmissions are ferrous materials which have a tendency to migrate to magnetic structures (i.e. solenoid operated valves) when carried by the circulating hydraulic fluid. Such contamination may result in undesirable increases in armature friction forces and potential jamming of the armature. With more and more transmission components being manufactured with powdered metal manufacturing processes, the potential for increased levels of ferrous contamination of hydraulic fluid may be increased both in a transmission's infancy and thereafter during its operative life.

SUMMARY

Therefore, it is an object of the present invention to improve performance characteristics of solenoid valves.

According to one aspect of the present invention, improved alignment of the valve armature along its stroke axis provides for reductions in the armature friction forces.

According to another aspect of the present invention, contaminant infusion around the armature is reduced.

These and other aspects of the invention are provided for in a solenoid valve having an electromagnetic coil surrounding a ferromagnetic armature. The armature has first and second axial ends and magnetic portions of the solenoid include first and second pole pieces at opposite axial ends of the coil. The armature is secured to one of the pole pieces such that it is prevented from radial movement yet is substantially free to reciprocate axially. An alignment tube surrounds the armature and is secured at one end to the pole piece to which the armature is secured. At the axially opposite end of the alignment tube is secured a nonmagnetic bearing which surrounds the other end of the armature such that the armature is free to move reciprocably therethrough. The nonmagnetic bearing may be coupled to the pole piece opposite the pole piece to which the armature is coupled provided that the attachment does not disturb the coaxiality of the bearing and sleeve. The sleeve additionally provides for an armature cavity which is sealed from the infusion of contaminated hydraulic fluid.

BRIEF DESCRIPTION OF THE DRAWING

The present invention will now be described, by way of example, with reference to the accompanying drawing, in which the FIGURE is a sectional view of a linear solenoid valve in accord with the present invention.

DETAILED DESCRIPTION

Referring to the FIGURE, an exemplary linear solenoid valve 10 has an electromechanical portion generally designated by the numeral 15 and a hydraulic portion generally designated by the numeral 20. The hydraulic portion 20 comprises fluid passage housing 51 including fluid inlet 53, chamber 55, poppet seat 59 and fluid exhaust passages 57. Poppet 43, which is displaceable between a seated position against poppet seat 59 as illustrated and a fully unseated position, provides for variable fluid bleed-off from fluid inlet 53 to exhaust passages 57. Aspects of fluidic operation are generally well known to those skilled in the art and further discussion thereof is not necessary for a complete understanding of the present invention.

The electromechanical portion 15 of solenoid valve 10 is generally constructed with a multiple winding electrical coil 21 surrounding an armature 41 fabricated from a ferromagnetic material. Coil 21 is conventionally wrapped around a non-magnetic spool 22 as illustrated. Spool 22 is preferably molded with integral connector body 75. Ferromagnetic pole pieces, generally designated, 31 and 34 are located adjacent the coil 21 at opposite axial ends thereof. Each pole piece 31 and 34 has a respective substantially annular portion, 32 and 33, extending radially beyond the outer circumference of coil 21. Pole piece 34 has a central aperture defined by the annular portion 33 and preferably continues generally within the inner sidewall of the spool to define an axially extending cylindrical portion 35 with similarly sized aperture. Pole piece 31 also has a central aperture defined by annular portion 32 and an axially extending cylindrical portion 37. As illustrated in the FIGURE, the annular portion 32 of pole piece 31 is peripherally abbreviated in the area of connector body 75 in order to accommodate the externalization of the electrical interface. Ferromagnetic sleeve 13 substantially surrounds coil 21 and spool 22 and extends axially between pole pieces 31 and 34 at the outer peripheries of respective annular portions 32 and 33. Of course, accommodation of the connector body precludes complete enclosure of the coil and spool at least in the limited general area thereof.

Armature 41 is located substantially coaxially with the aperture through annular portion 33 of pole piece 34 such that it is in spaced adjacency with the cylindrical portion 35 of pole piece 34. This non-bearing positional relationship is provided for by a radially non-compliant member 65 which extends radially from the armature to a portion of the pole piece 34. Preferably, member 65 takes the form of a diaphragm spring formed from long-life stainless steel, one such exemplary material being 7C27MO2 stainless steel available from Sandvik, Inc., Fair Lawn, N.J. In the present embodiment, the armature 41 is characterized by several progressively smaller diameter sections or steps which provide convenient mounting provisions for staking member 65 thereto. Similar steps are provided in analogous fashion toward the outer periphery of the annular portion 33 of pole piece 34 which likewise provide convenient mounting provisions for the outer periphery of member 65. A flexible seal 63 is similarly located between the armature 41 and pole piece 34. Seal 63 seats similarly upon respective stepped portions of the armature 41 and annular portion 33 of pole piece 34. Hydraulic portion 20 of the solenoid valve 10 bears against the outer periphery of the member 65 at an outer lip or rim 51. Frame 23 is crimped or rolled over annular portion 32 of pole piece 31 to retain the structures described.

At the axial end of the armature 41 closest to pole piece 34 is poppet 43 which is preferably a part separately fabricated and is press fitted into, or otherwise secured to, armature 41. This assembly is fabricated to stringent dimensional tolerances to be able to set overlap of the armataure 41 with respect to pole piece 31 and specifically the cylindrical portion 37. Running the axial length of armature 41 are a plurality of channels 47 for relieving and equalizing fluid pressures within the armature cavity. While it is generally undesirable to allow for hydraulic fluid infusion into the armature cavity while in operation, a small amount of the same or compatible virgin fluid is disposed therein during assembly for lubrication of the armature 41 and bearing 61 described later. The other axial end of armature 41 has a bore defined by tapered side wall 45. Located within the bore and communicating with the base thereof is bias spring 27. The tapered side wall feature prevents spring 27 from binding within the bore and contributes to the overall desirable magnetic characteristics of such a linear device. The opposite end of spring 27 bears against screw 19 threaded into ferromagnetic collar 17. Collar 17 in turn may be joined to cylindrical portion 18 of pole piece 31 by threads or press fitted therein. Alternatively, collar 17 may be formed integral with the pole piece 31. While described separately, collar 17 and screw 19 are considered to be portions of pole piece 31. Screw 19 provides for a range of adjustment to the spring bias force. Collar 17 is substantially aligned with the terminal portion of tapered side wall 45 of armature 41, the flux therebetween generally providing increased axial motive force at higher current levels as the armature is increasingly displaced toward the left in the FIGURE. When the armature is in the full rightward position as illustrated, however, the majority of axial motive force is impressed vis-a-vis the flux between the tapered side wall and the cylindrical portion of pole piece 31. The gap between collar 17 and armature 41 is set to establish the desired force versus displacement characteristics of the solenoid valve in a fashion familiar to those skilled in the art. Therefore, the depth of insertion of collar 17 into cylindrical portion 18 is determined by the desired performance characteristics of the particular application. Pole piece 31 generally closes the respective end of the solenoid as embodied in the plugging function of the collar 17 and screw 19. Where the additional feature of spring bias force adjustability is not desired, cylindrical portion 18 may be eliminated and the pole piece 31 formed without the central aperture therethrough.

The axial end of armature 41 closest to pole piece 31 is slidably disposed through non-magnetic bearing 61. Preferably, non-magnetic stainless steel is used for bearing 61 since such material provides thermal expansion characteristics similar to those of the ferromagnetic material of cylindrical portion 37 of pole piece 31 and has cycle wear qualities providing long life. Bearing 61 is fixably coupled to cylindrical portion 37 of pole piece 31 by press fitting a cylindrical extension thereof to the inner surface of the cylindrical portion 37 of pole piece 31. Critical to high frequency PWM operation, the actual bearing surface, that is to say the inner surface of bearing 61, has a substantially smooth surface finish. A surface roughness of substantially 0.5 µm using stainless steel has been found to provide acceptable performance at PWM frequencies of substantially 600 Hz. Positional tolerances of the bearing are also tightly controlled to facilitate smooth pistonic movement of the armature along an axis which is coaxial with the armature axis. Therefore, alignment sleeve 71 is press fitted at one end thereof over bearing 61 of pole piece 31. The axially opposite end of alignment sleeve is similarly press fitted over cylindrical portion 35 of pole piece 34. The arrangement as described provides for the desired coaxiality between the pistonic motion of armature 41 and bearing 61. It is here noted, however, that the outer diameter of the bearing 61 is larger than the outer diameter of the cylindrical portion 37 to prevent out of roundness or non-concentricity of the cylindrical portion 37 relative to the bearing 61 from negatively impacting the desirable positional tolerancing of the bearing. The described arrangement, particularly the mounting and alignment provisions of the cylindrical portion 35 relative to the alignment sleeve, is preferred for its simplicity in assembly and robustness in structure. Alternative assembly between the alignment sleeve and pole piece 34 may be effectuated providing of course that the objective of alignment of the bearing 61 at the distal end of the sleeve provides for pistonic motion of the armature which is coaxial with its physical major axis.

Sleeve 71 is preferably formed from non-magnetic stainless steel which again provides for thermal expansion characteristics that are desirably similar to its mated parts, and has the structural integrity to maintain dimensional stability through the manufacturing processes, in particular any press fitting thereof to cylindrical portion 35 of pole piece 34 and to bearing 61.

Advantageously, alignment sleeve 71 provides closure about the armature cavity to prevent infusion of contaminants, particularly ferrous particles. As previously mentioned, frame 23 does not provide for complete sealing of the enclosed structure of the solenoid valve due at least in part to the accommodating provisions for the electrical connector body. As can be appreciated by examination of the FIGURE, the major infusion path from at least the most visibly direct path of the connector body pass through is removed by the alignment tube coupled between the pole piece 34 and bearing 61 thereby providing a substantially sealed armature cavity.

While the invention has been described with respect to a preferred embodiment including specifically a preferred linear control valve, such description is offered by way of example and is not intended to be taken in any way as limiting the scope of the invention which is defined in the appended claims.

We claim:

1. A solenoid controlled valve for regulating the flow of a hydraulic fluid having an electromagnetic coil surrounding a ferromagnetic armature having first and second axial ends and first and second pole pieces at opposite axial ends of the coil, said valve comprising:

a non-magnetic bearing slidably engaged with the first axial end of said armature such that the armature is free to move reciprocably therethrough;

means retaining the second axial end of said armature to the second pole piece for preventing radial displacements of said armature; and, an alignment sleeve having first and second axially opposite ends, the first end of said sleeve fixably coupled to the second pole piece such that the second end of the armature is substantially coaxial therewith, the second end of said sleeve coaxially and fixably coupled to said non-magnetic bearing.

2. The solenoid controlled valve as claimed in claim 1 wherein said non-magnetic bearing is fixably coupled to the first pole piece such that the coaxiality of the non-magnetic bearing and sleeve is undisturbed.

3. The solenoid controlled valve as claimed in claim 2 wherein the coupling of said sleeve to the second pole piece and the coupling of the non-magnetic bearing to the first pole piece are effective to prevent infusion of the hydraulic fluid at the respective couplings.

4. A solenoid controlled valve for regulating the flow of a hydraulic fluid having an electromechanical portion including a coil surrounding ferromagnetic armature having first and second axial ends, and first and second pole pieces at opposite axial ends of the coil, said valve comprising:

a non-magnetic bearing slidably engaged with the first axial end of said armature such that the armature is free to move reciprocably therethrough;

a yieldable member characterized by axial compliance and radial non-compliance for securing the second axial end of said armature to the second pole piece;

said second pole piece having an axially extending cylindrical portion coaxial with and in spaced adjacency to said armature, said cylindrical portion extending toward said first pole piece; and, an alignment sleeve having first and second axially opposite ends, the first end of said sleeve coaxially and fixably coupled to the cylindrical portion of said second pole piece, the second end of said sleeve coaxially and fixably coupled to said non-magnetic bearing.

5. The solenoid controlled valve as claimed in claim 4 wherein said non-magnetic bearing is coupled to said first pole piece, the coupling of the non-magnetic bearing to the first pole piece and the coupling of the first end of said sleeve to the cylindrical portion of said second pole piece being effective against hydraulic fluid infusion.

6. A solenoid controlled valve for regulating the flow of a hydraulic fluid having an electromechanical portion including a coil surrounding ferromagnetic armature having first and second axial ends, and first and second pole pieces at opposite axial ends of the coil, said valve comprising:

said second pole piece defining a central aperture through which the second axial end of the armature reciprocates;

means retaining the second axial end of said armature to the second pole piece for preventing radial displacements of said armature such that the second end of the armature remains in spaced adjacency with the central aperture;

sealing means between the second axial end of the armature and the second pole piece; and, an alignment sleeve having first and second axially opposite ends, the first end of said sleeve fixably coupled to the second pole piece such that the second end of the armature is substantially coaxial therewith, the second end of said sleeve coaxially and fixably coupled to a non-magnetic bearing slidably engaged with the first axial end of said armature such that the armature is free to move reciprocably therethrough in substantial coaxiality therewith, the non-magnetic bearing further being fixably coupled to the first pole piece.

7. The solenoid controlled valve as claimed in claim 6 wherein said second pole piece includes a cylindrical portion coaxial with the central aperture and extending toward said first pole piece, said sleeve fixably coupled to the second pole piece around the cylindrical portion thereof.

* * * * *